(12) United States Patent
Bansal et al.

(10) Patent No.: US 8,234,691 B2
(45) Date of Patent: *Jul. 31, 2012

(54) DIGITAL SOCIAL NETWORK TRUST PROPAGATION

(75) Inventors: Pradeep K. Bansal, Monmouth Junction, NJ (US); Lee Begeja, Gillette, NJ (US); Carroll W. Creswell, Basking Ridge, NJ (US); Jeffrey Farah, North Brunswick, NJ (US); Benjamin J. Stern, Morris Township, NJ (US); Jay Wilpon, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/858,863

(22) Filed: Aug. 18, 2010

(65) Prior Publication Data

US 2010/0313243 A1    Dec. 9, 2010

Related U.S. Application Data

(63) Continuation of application No. 11/296,357, filed on Dec. 8, 2005, now Pat. No. 7,802,290.

(51) Int. Cl.
*G06F 15/16* (2006.01)
*G06F 17/30* (2006.01)

(52) U.S. Cl. ............................................. 726/3
(58) Field of Classification Search .................. 726/3
See application file for complete search history.

(56) References Cited

U.S. PATENT DOCUMENTS 7,802,290 B1 * 9/2010 Bansal et al. ............... 726/3
2006/0248573 A1 * 11/2006 Pannu et al. ................ 726/1

* cited by examiner

*Primary Examiner* — Kambiz Zand
*Assistant Examiner* — Aubrey Wyszynski
(74) *Attorney, Agent, or Firm* — Jackson Walker L.L.P.

(57) ABSTRACT

A trust propagation system is disclosed that propagates trust data based on established trust relationships. The trust system may automatically propagate trust data between parties A and C based on trust relationships with a common party B. Trust data may include authentication data such as biometric data, encryption data, passwords, etc. that may be used to conduct exclusive communications.

20 Claims, 10 Drawing Sheets

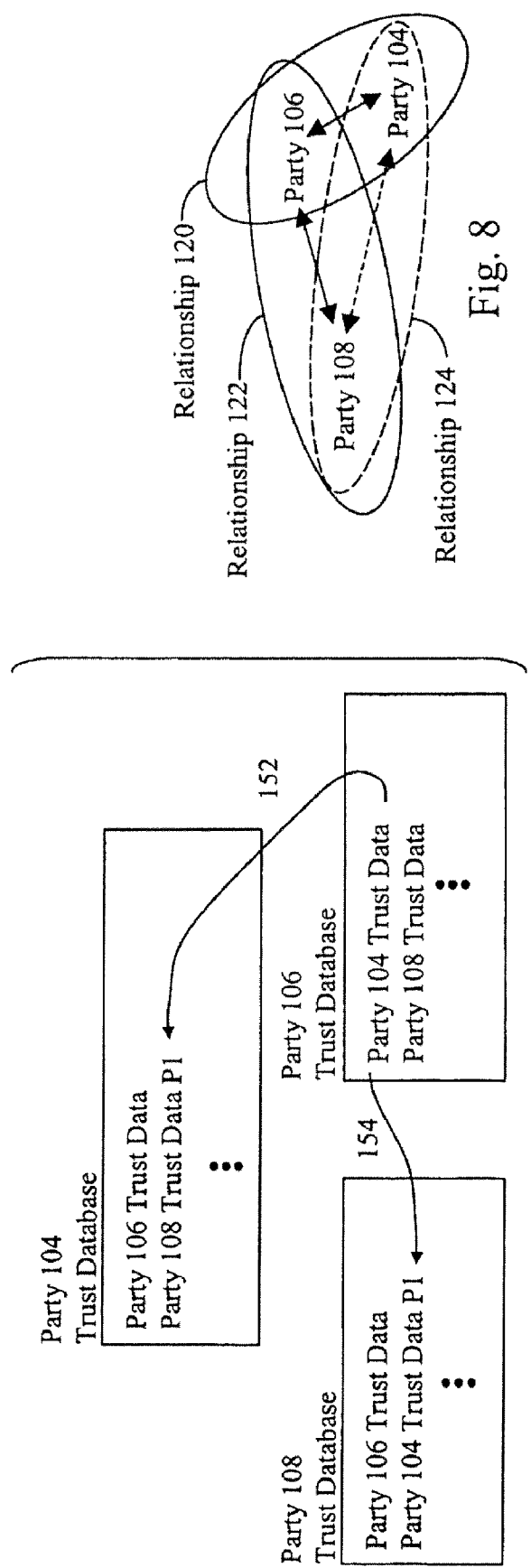

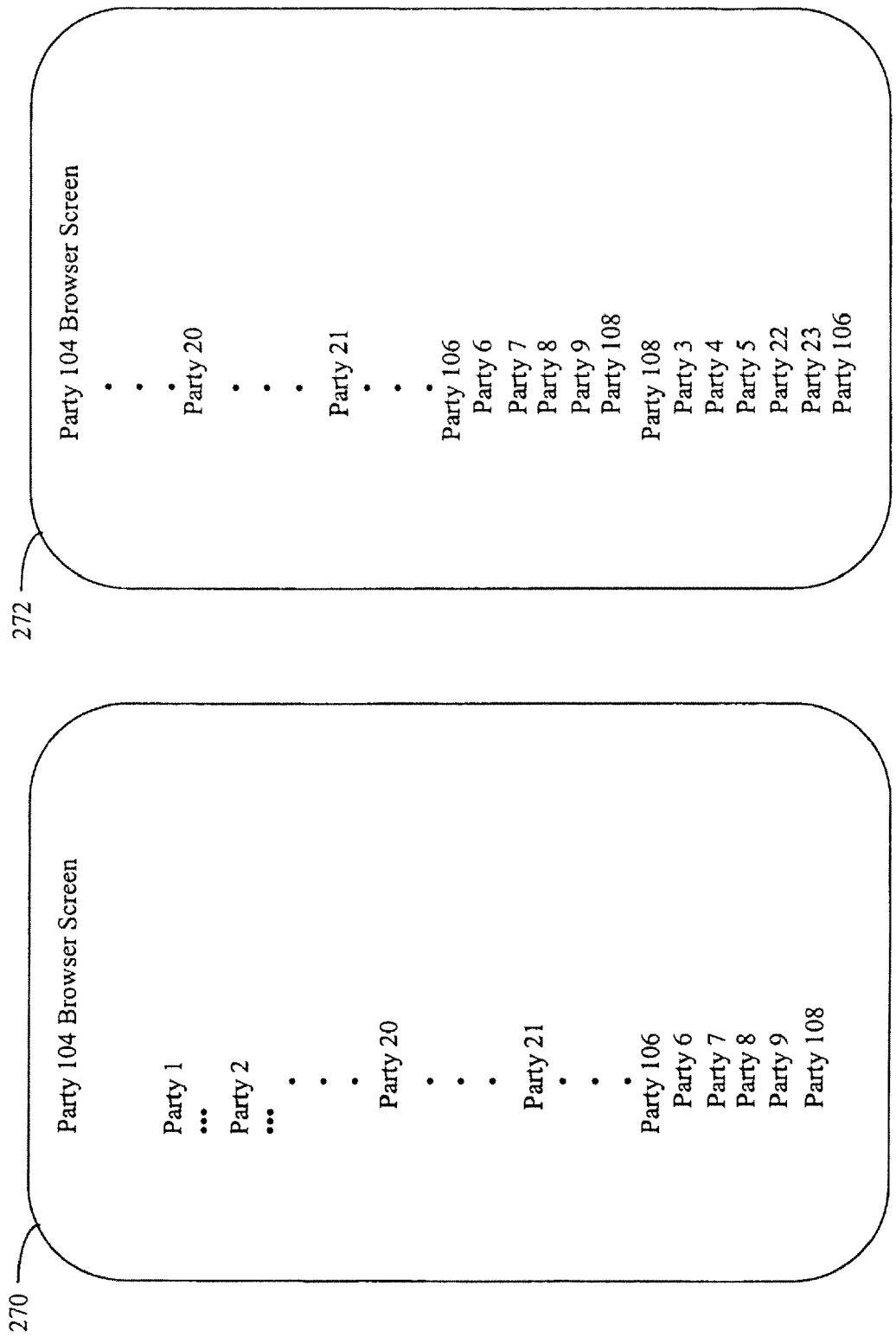

DIGITAL SOCIAL NETWORK TRUST PROPAGATION

BACKGROUND

Digital social networks such as LinkedIn or Friendster permit many parties to network with one another, building social groups for various purposes. Trust relationships may be established within such networks. New technology is needed to propagate the trust relationships.

SUMMARY

A trust propagation system is disclosed that automatically propagates trust data based on already established trust relationships. For example, if party A and party B have an established trust relationship and party B and party C have an established trust relationship, the trust system may automatically propagate trust data between parties A and C based on trust relationships with the common party B. Trust data may include authentication data such as biometric data, encryption data, passwords, etc. that may be used to conduct exclusive communications.

Many times in digital social networks, parties naturally organize into groups such as professional groups, recreation groups, hobby groups, etc. Parties that have established trust relationships within each group may expand these trust relationships to other parties who have established trust relationships with common parties. In this way, the trust propagation system permits parties within the digital social networks to form new trust relationships, thus expanding their contacts or links within the digital social network.

BRIEF DESCRIPTION OF THE DRAWINGS

The invention is described in detail with reference to the following figures wherein like numerals reference like elements, and wherein:

FIGS. 7 and 8 show exemplary propagation of trust data;

FIGS. 10 and 11 show exemplary link browser displays before and after trust data propagation;

DETAILED DESCRIPTION OF EMBODIMENTS

Figure 1:
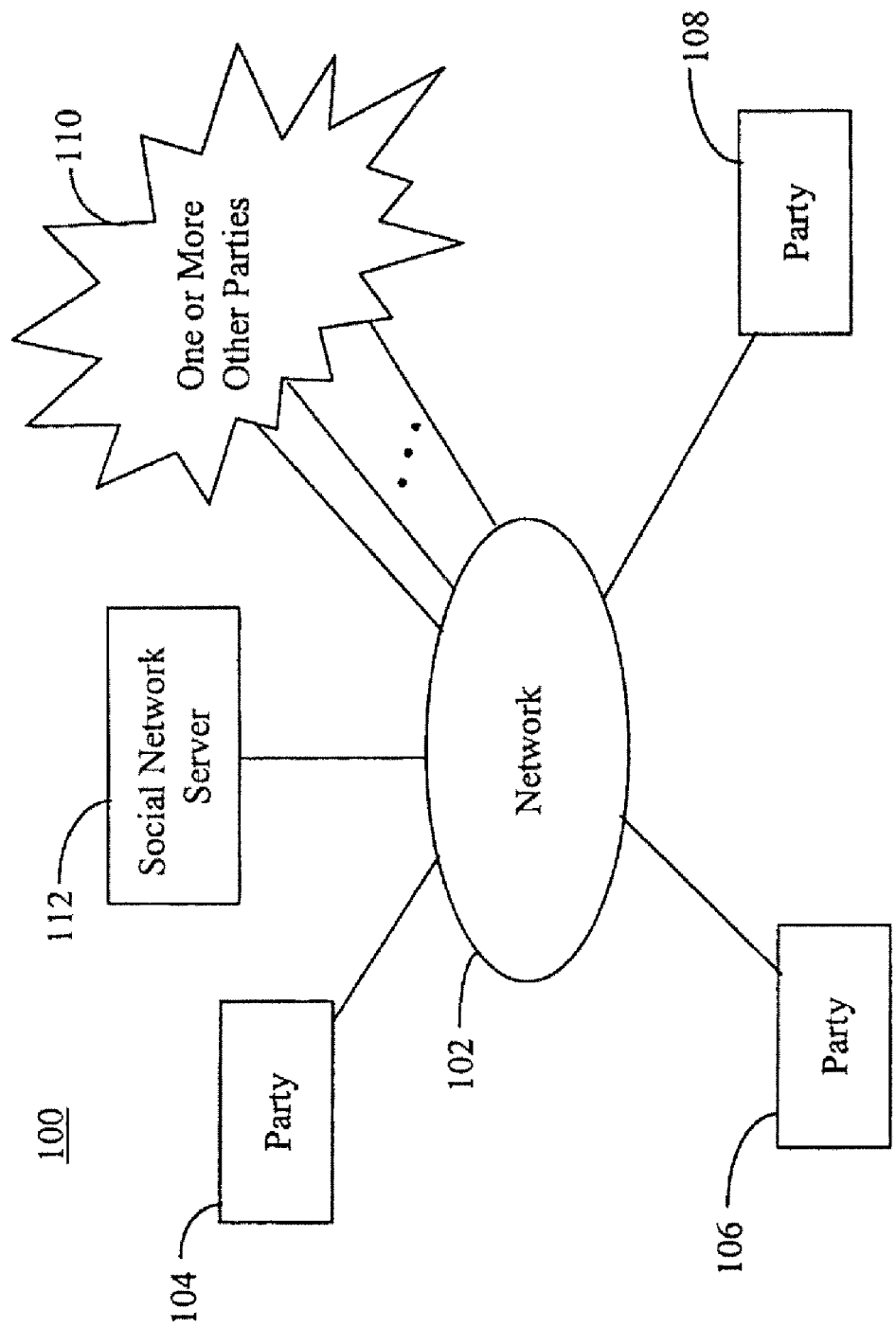
FIG. 1 shows an exemplary diagram of a trust propagation system.

FIG. 1 shows an exemplary trust propagation system 100 that includes a network 102, parties 104-108, one or more other parties 110 and a social network server 112. Network 102 may be wired, wireless, a local area network (LAN), a wide area network (WAN), a peer-to-peer network, the Internet, etc. or any combination of these that interconnects parties 104-110 and the social network server 112.

Social networks may be established among parties 104-110 via e-mail, chat rooms, instant messaging, or other non-electronic social environments and these social networks may be extended in a digital social network. While not all digital social networks require trust relationships, the ones that require trust relationships may permit interaction between network members at a different level than is possible otherwise. For example, digital social networks such as LinkedIn, permit business executives such as CEOs, presidents, CFOs to form a sub-network of links so that members of the sub-network may communicate at the executive level where the communication is naturally focused on subject matters of interest. Trust relationships within such sub-networks are naturally exclusive. Trust propagation system 100 provides an automatic facility to propagate trust data and thus enable network members to establish new links of communication and thus expand their sub-networks.

Figure 2:
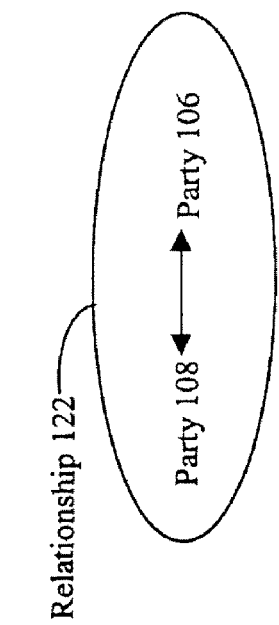
Figure 4:
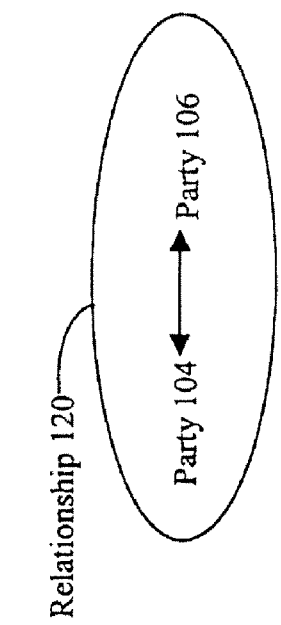

For example, parties 104 and 108 do not have a direct trust relationship, but both parties have existing trust relationships 120 and 122 with party 106, as shown in FIGS. 2 and 4. Thus, parties 104 and 108 both have direct links to party 106. However, party 104 does not have a direct link to party 108. Trust propagation system 100 provides a link browser and a trust data propagation capability that assist party 104 to establish a trust relationship with party 108 based on the trust relationships with common party 106.

Figure 3:
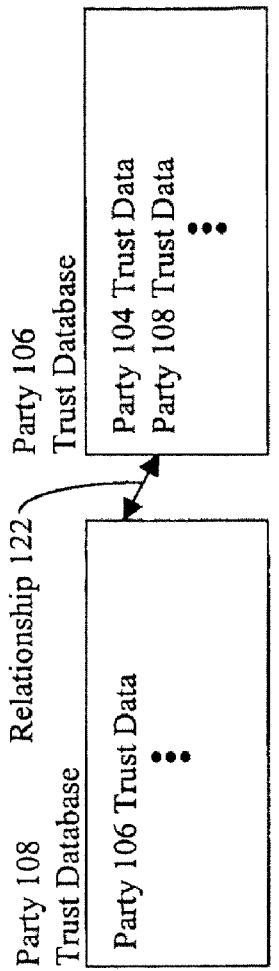
FIGS. 2-5 show exemplary trust relationships and corresponding trust databases.
Figure 5:
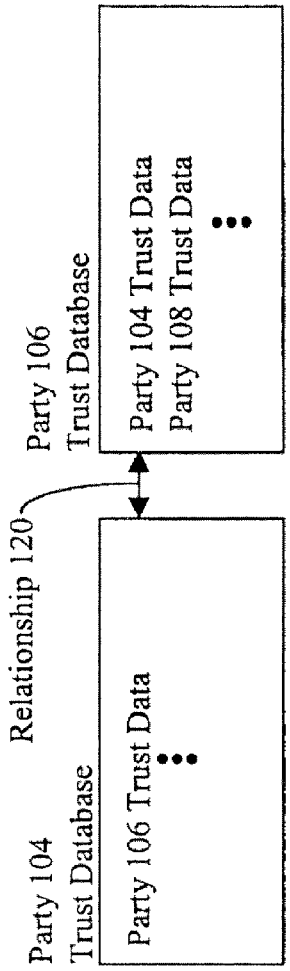

FIGS. 3 and 5 show trust databases of parties 104-108 prior to party 104 establishing a direct link to party 108 and prior to trust data propagation. The trust databases of parties 104 and 108 include party 106's trust data and the trust database of party 106 includes trust data of parties 104 and 108. Thus, the trust databases of parties 104-108 reflect relationships 120 and 122 as shown in FIGS. 2 and 4. Parties 104 and 106 may conduct exclusive communication with each other using encryption keys of the other party's trust data, for example, and similarly parties 106 and 108 may conduct exclusive communication. But, parties 104 and 108 cannot conduct exclusive communication because these parties cannot access each other's trust data.

Figure 6:
FIG. 6 shows exemplary link levels between parties.

The link browser provided in trust propagation system 100 enables parties within a sub-network to view links of other parties based on control parameters that specify a link level or depth of the sub-network that a party is permitted to view. For example, FIG. 6 shows an exemplary link relationship between party 104 and other parties which are members of a sub-network. As noted above, party 104 is directly linked to party 106 and party 106 is directly linked to party 108. However, party 104 does not have a direct link to party 108 but is linked to party 108 only through party 106. Thus, as shown in FIG. 6, party 104 and party 106 has a link level of 0 because they are directly linked while party 104 has a link level of 1 to party 108 because party 104 is linked to party 108 through party 106. Party 104 has a link level of 2 to party 4 because party 104 is separated from party 4 by parties 106 and 108.

If the link browser control parameters for the sub-network that includes parties 104-106 is set to one, then party 104 may not only view all the parties to which party 104 is directly linked but also view all the parties not directly linked to party 104 but are directly linked to party 106. Thus, using the link browser, party 104 may identify party 108 as linked to party 106 even though party 104 and party 108 do not have a direct link and therefore have not established a direct trust relationship between each other, i.e., no direct link.

The trust data propagation provided in trust propagation system 100 automatically propagates trust data along links of a sub-network based on control parameters of the sub-network. For example, if the sub-network control parameters specify that trust data of members of the sub-network may be automatically propagated to link level 1 parties, then trust data of party 104 may be propagated to party 108 by way of the link between party 104 and party 106 and the link between party 106 and party 108. Also, trust data of party 108 may be propagated to party 104 via the link between party 108 and party 106 and the link between party 106 and party 104.

Assuming that the sub-network control parameters associated with the sub-network that includes parties 104-108 specify trust data propagation to link level 1 parties, then after trust data propagation along arrows 152 and 154, as shown in FIG. 7, contents of the trust databases of parties 104-108 are modified as shown. The trust database of party 104 includes party 106's trust data and party 108's trust data. Party 108's trust data in party 104's trust database may be tagged with an additional flag "P1" indicating that party 108's trust data was added by a link level 1 propagation. Similarly, party 108's trust database includes party 106's trust data and party 104's trust data, and party 104's trust data may be tagged with a flag P1. FIG. 8 shows the relationships that are reflected in the trust databases for parties 104-108. Relationships 120 and 122 are established relationships where parties 104 and 106 have a mutual trust relationship and parties 106 and 108 have a mutual trust relationship. However, relationship 124 is a propagated trust relationship where parties 104 and 108 have not established a direct trust relationship.

Figure 9:
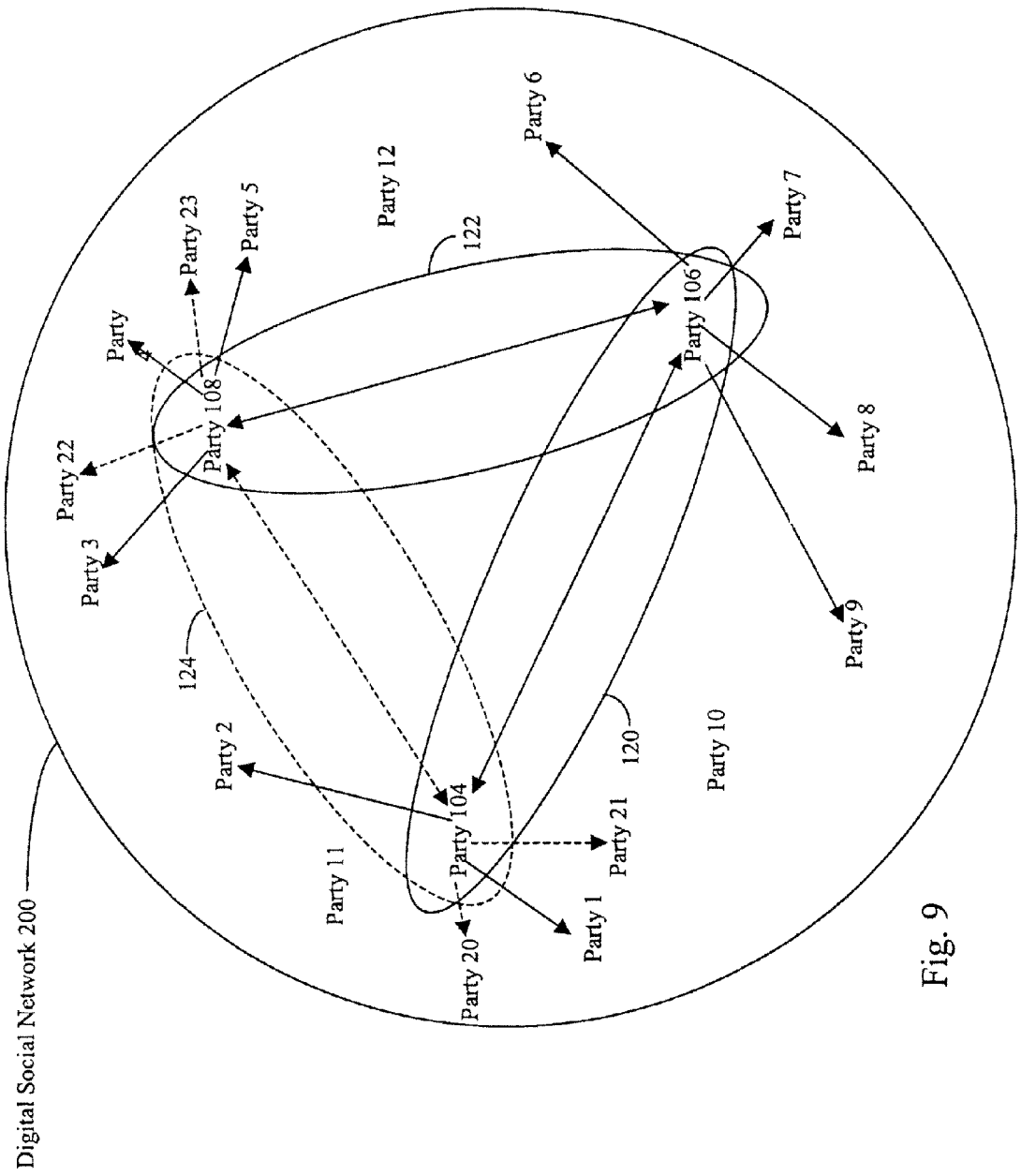
FIG. 9 shows an exemplary link diagram within a digital social network.

FIG. 9 shows a digital social network 200 of which parties 104-108 participate and which includes parties 1-12 and 20-23 as other parties 110. As shown, party 104 has direct trust relationships with parties 1, 2 and 106; party 106 has direct trust relationships with parties 6-9, 104 and 108 and party 108 has direct trust relationships with parties 3-5 and 106. The dashed arrows show link level 1 relationships between party 104 and parties 20, 21 and 108; and between party 108 and parties 22, 23 and 104. Parties 10-12 are not linked to parties 104-108 at all, and thus, trust propagation may not propagate to these parties unless at least one of the parties within the sub-network that parties 104-108 participate establishes a link with these parties 10-12.

Assuming the conditions shown in FIG. 9, when party 104 uses the link browser to view party 106's links up to link level 1, the link browser may show screen 270 as illustrated in FIG. 10, for example. Here, parties 6-9 and 108 are shown to be directly connected to party 106. If a direct connection with party 108 is desired, party 104 may select party 108 in link browser screen 270 by using a mouse, for example. When party 104 selects party 108, trust propagation system 100 may alert party 108 of party 104's desire to establish a trust relationship by sending an e-mail to party 108 indicating the same, for example. Trust propagation system 100 may use other communication methods to contact party 108. For example, trust propagation system 100 may send a facsimile, pager message, voice-mail, written letter, etc. If the requested trust relationship is accepted, party 108 may reply to the e-mail indicating acceptance of the request for the trust relationship. Alternatively, party 108 may use the link browser and select party 104 to indicate acceptance of the trust relationship. After acceptance by party 108, trust propagation system 100 may propagate party 104's trust data to party 108 and party 108's trust data to party 104. If trust propagation link level control parameter is set to greater than 0 such as to 1, for example, then party 104's trust data may be propagated to parties 3-5 and party 108's trust data may be propagated to parties 1 and 2, for example.

Trust data propagation system 100 may have control of trust data of all parties of a digital social network. For example, the trust data may be stored a profile associated with each party. Under these circumstances, trust data propagation may be achieved by adding pointers into receiving parties' profiles to the trust data of trust-data-source parties that are propagated or making copies of the propagated trust data in the receiving parties' profiles. If the trust data of trust-data-source parties are not stored in trust propagation system 100 but in respective end-user systems of the trust-data-source parties, then trust propagation system 100 may be extended by placing a program in each party's end-user system to transfer trust data for propagation purposes, for example.

However, if a trust-data-source party prefers to keep absolute control over the trust data, then trust propagation system 100 may send a message either to the trust-data-source party's end-user system based on contact data stored in trust-data-source party's profile to request trust data for propagation or indicate the request to the trust-data-source party on the party's next access to the digital social network, and the trust-data-source party may decide whether to release the requested trust data. For example, trust propagation system 100 may send an e-mail providing appropriate details such as the receiving parties and the common party or parties whose actions generated the trust propagation request. If the trust data request is accepted, the trust-data-source party may send the requested trust data in a return e-mail, for example, and transfer the trust data to the trust propagation system 100 for distribution to the receiving parties. Alternatively, the trust-data-source party may send the trust data directly to one or more of receiving parties listed by trust propagation system 100. In this case, the trust-data-source party may provide an indication to trust propagation system 100 that the requested trust data propagation has been resolved and trust propagation system 100 may place a flag to indicate that resolution thus preventing repeated requests for the same propagation event.

After party 108 accepts the trust relationship with party 104, the link browser may permit party 104 to view link level 1 parties of party 108 and permit party 108 to view link level 1 parties of party 104. Party 104's link browser may display screen 272 as shown in FIG. 11 indicating that parties 3-5 and 22, 23 and 106 are directly linked to party 108.

The above example assumes that sub-network control parameters have set the link browser to display only link level 1 parties and propagates trust data only to link level 0 parties. However, any link level may be set for the link browser and separately for trust data propagation so that a party may view other parties' links up to the link level allowed by the sub-network control parameters. Similarly, trust propagation system may propagate trust data of parties to any link level subject to trust data accessibility discussed above. The trust propagation system 100 may indicate in the trust database associated with each propagated trust data the link level distance between the party associated with each trust data and the party to which the trust database belongs.

Figure 12:
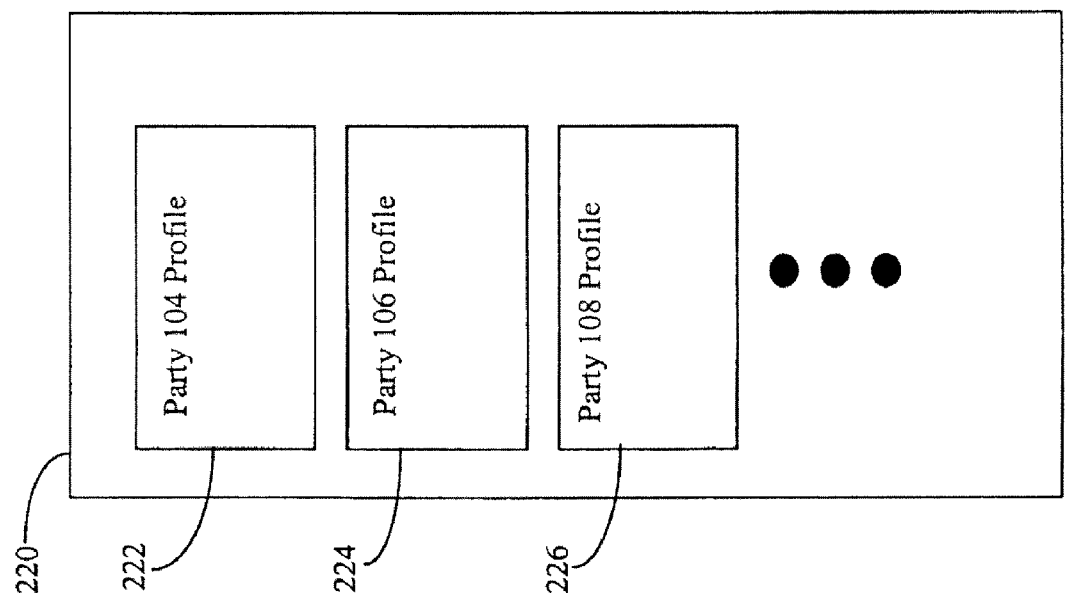
FIG. 12 shows an exemplary diagram of a digital social network profile database.

FIG. 12 shows an exemplary profile database 220 that may be maintained by trust propagation system 100. Profile database 220 includes profiles of parties that are included in the digital social network such as profile 222 for party 104, profile 224 for party 106 and profile 226 for party 108. Each of the profiles may include sub-networks participated by each of the parties and a trust database of the party as discussed above.

Figure 13:
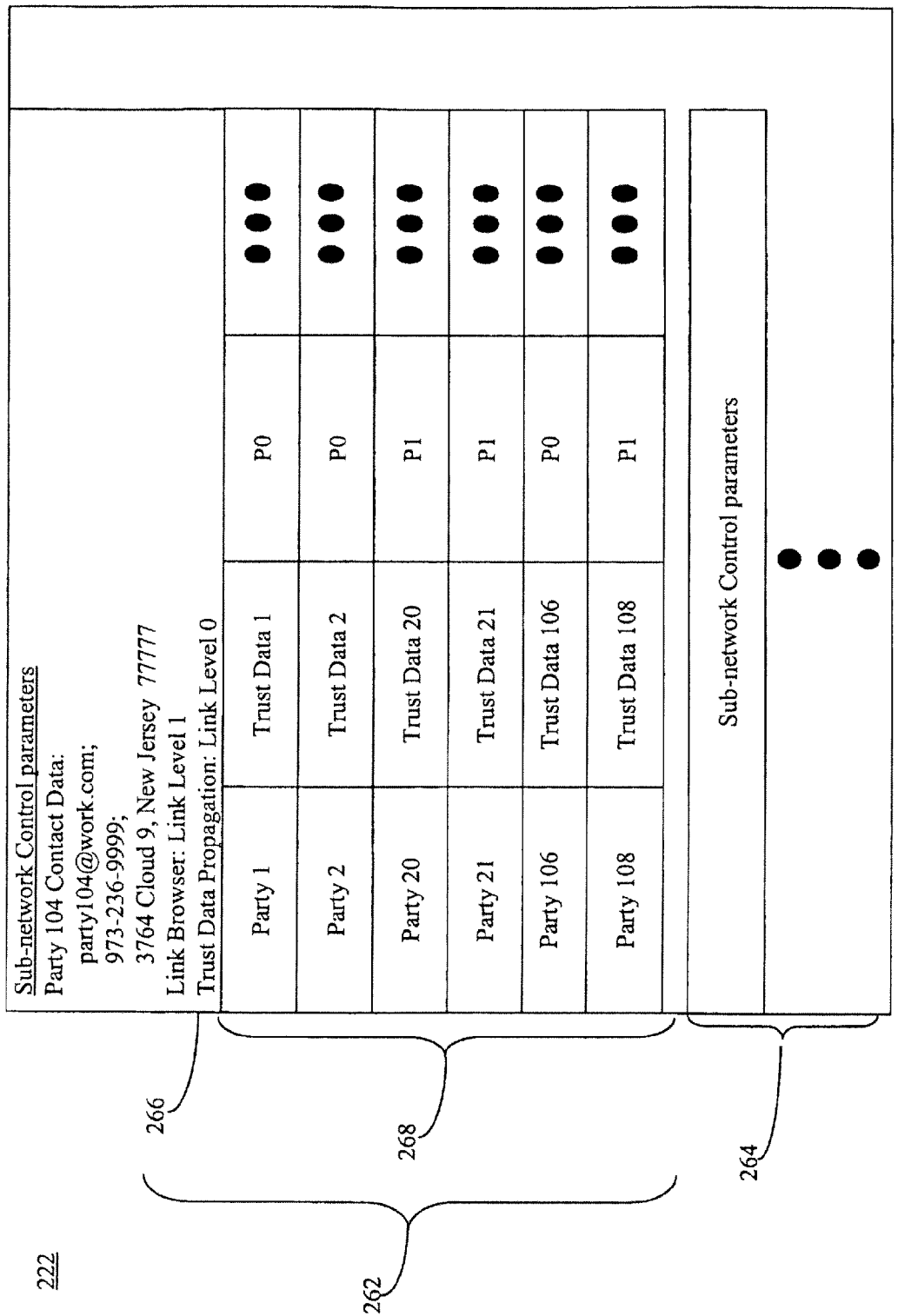
FIG. 13 shows a profile for a particular party shown in FIG. 9.

For example, FIG. 13 shows an exemplary profile 222 for party 104 that includes sub-network 262 and sub-network 264, for example. Sub-networks 262 and 264 are obviously connected by party 104. However, party 104 may have specified in the respective control parameters of the separate sub-networks to keep the sub-networks separate and thus block link browser from viewing links between the sub-networks and block trust data propagation between the sub-networks. The profile data for sub-network 262 includes a sub-network control parameters entry 266 which may include contact data for party 104 in addition to control parameters and a trust database 268. The example shown in FIG. 13 indicates a link browser parameter constrains the link browser to display only up to link level 1 parties and a trust propagation parameter that constrains trust data propagation only up to link level 0 parties. The control parameters controlling the link browser and the trust data propagation may be set to different link levels.

Trust database 268 indicates that parties 1, 2 and 106 are direct links (P0) and parties 20, 21 and 108 are link level 1 links (P1). After party 108 accepts party 104's request to establish a trust relationship, the propagation link level corresponding to party 108 may be changed from P1 to P0 indicating a direct link.

While FIG. 13 shows that trust data of parties 1, 2, 20, 21, 106 and 108 are stored in party 104's profile, only pointers may be stored so that when party 104 desires to communicate with any of the parties in the profile, trust propagation system 100 may be required to retrieve the needed trust data. For example the trust data may be stored in a more secure memory and only limited access is allowed. Also, as an alternative, the trust data may be stored in party 104's end-user system and used by party 104 apart from trust propagation system 100. In this case, the trust database may either store another copy of the trust data, have a pointer to a secure database of trust data or have an indication that trust data was propagated to party 104 and that party 104 should have possession of the trust data.

Figures 14, 15:
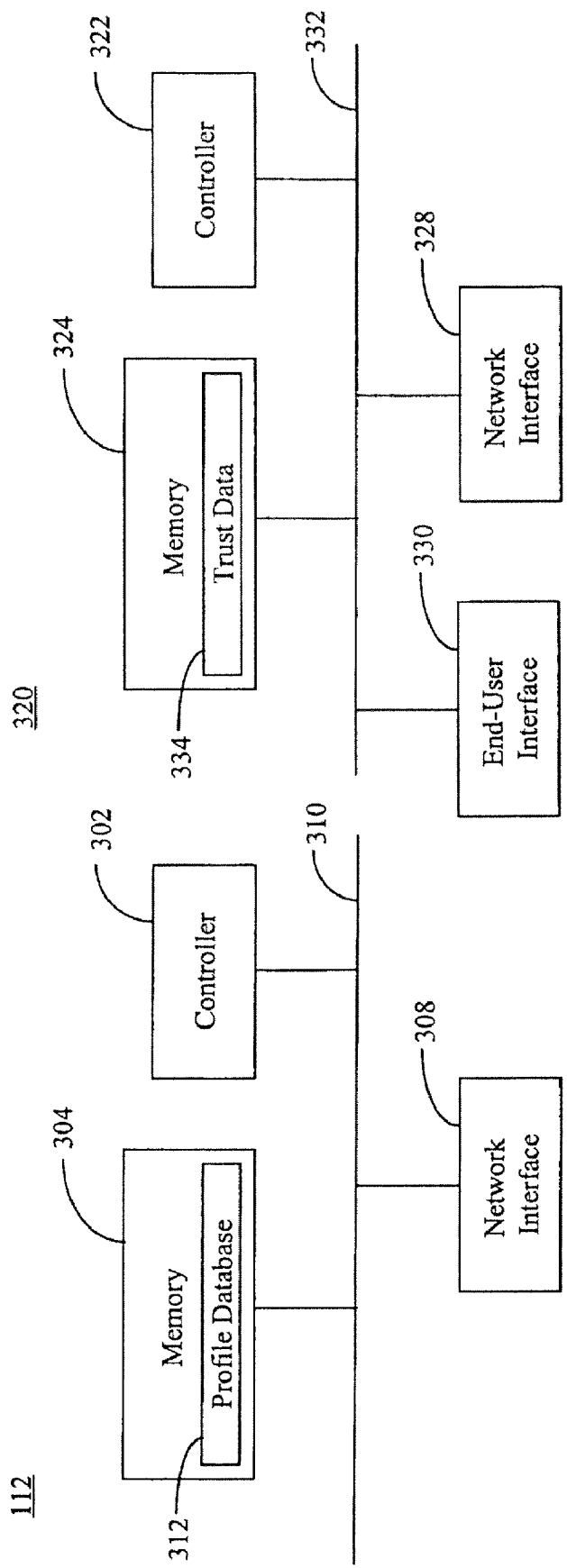
FIGS. 14 and 15 show exemplary block diagrams of a digital social network server and an end-user system for a party.

FIGS. 14 and 15 show exemplary block diagrams of social network server 112 and end-user system 320 corresponding to party 104. Social network server 112 may include a controller 302, a memory 304 and a network interface 308. These components are coupled together via bus 310. As an example, FIG. 14 shows profile database 312 stored in memory 304.

FIG. 15 shows end-user system 320 including a controller 322, a memory 324, an end-user interface 330 and a network interface 328. These components may be coupled together via bus 332. As an example, FIG. 15 shows party 104's trust data 334 being stored in memory 324.

While FIGS. 14 and 15 show social network server 112 and end-user system 320 using bus architectures, any type of hardware architecture including wired and wireless networks, may be used based on implementation details. For example, memories 304, 324 and network interfaces 308, 328 may be directly connected to respective controllers 304 and 322. Also, these hardware components may be implemented using any available hardware technology such as FPGA, PAL, application specific integrated circuits (ASICs), etc. Memories 304 and 324 may be RAM, ROM, hard disk, optical disk, etc.

Party 104 may logon to social network server 112 via end-user interface 330, network interface 328, and network interface 308 to invoke the link browser and view other party's links stored in profile database 312. When party 104's logon and required data are received via network interface 328, controller 322 may provide a display of screen 270, as shown in FIG. 10, to party 104 via end-user interface 330, for example. Party 104 may then select party 108 by moving a mouse and clicking on party 108 to indicate a desire to establish a trust relationship with party 108. When party 104 selects party 108, party 104's link browser may send a message to social network server 112 to indicate the selection. When the message is received via network interface 308, controller 302 may issue an e-mail to party 108 indicating that party 104 desires to establish a trust relationship. As discussed above, controller 302 may indicate to party 108 party 104's desire to establish a trust relationship using other methods. For example, controller 302 may store an indicator in party 108's profile so that on the next occasion when party 108 invokes the link browser, a message may appear on party 108's end-user interface indicating that party 104 desires to establish a trust relationship.

When party 108 accepts party 104's request to establish a trust relationship, controller 302 may propagate party 104's and party 108's trust data to link level 0 parties. However, as shown in FIG. 15, party 104's trust data 334 may be stored in memory 324 which is not accessible to controller 302 unless provided by party 104. Thus, party 104 may include trust data 334 in the initial request to establish a trust relationship with party 108 so that controller 302 may store trust data 334 in memory 304 in anticipation of party 108's acceptance. Similarly, party 108 may include party 108's trust data when accepting party 104's request to establish a trust relationship. Alternatively, controller 302 may issue a request to both parties 108 and 104 to provide their respective trust data when party 108 accepts party 104's request for a trust relationship.

When party 104 and party 108's trust data are received, controller 302 may propagate party 104's trust data to link level 0 parties of party 108 and party 108's trust data to link level 0 parties of party 104. Subsequent to trust data propagation, party 104 may request to view party 108's links via the link browser and controller 302 may provide data for controller 322 to display browser screen 272 showing party 108's link level 1 parties shown in FIG. 11, for example.

Figure 16:
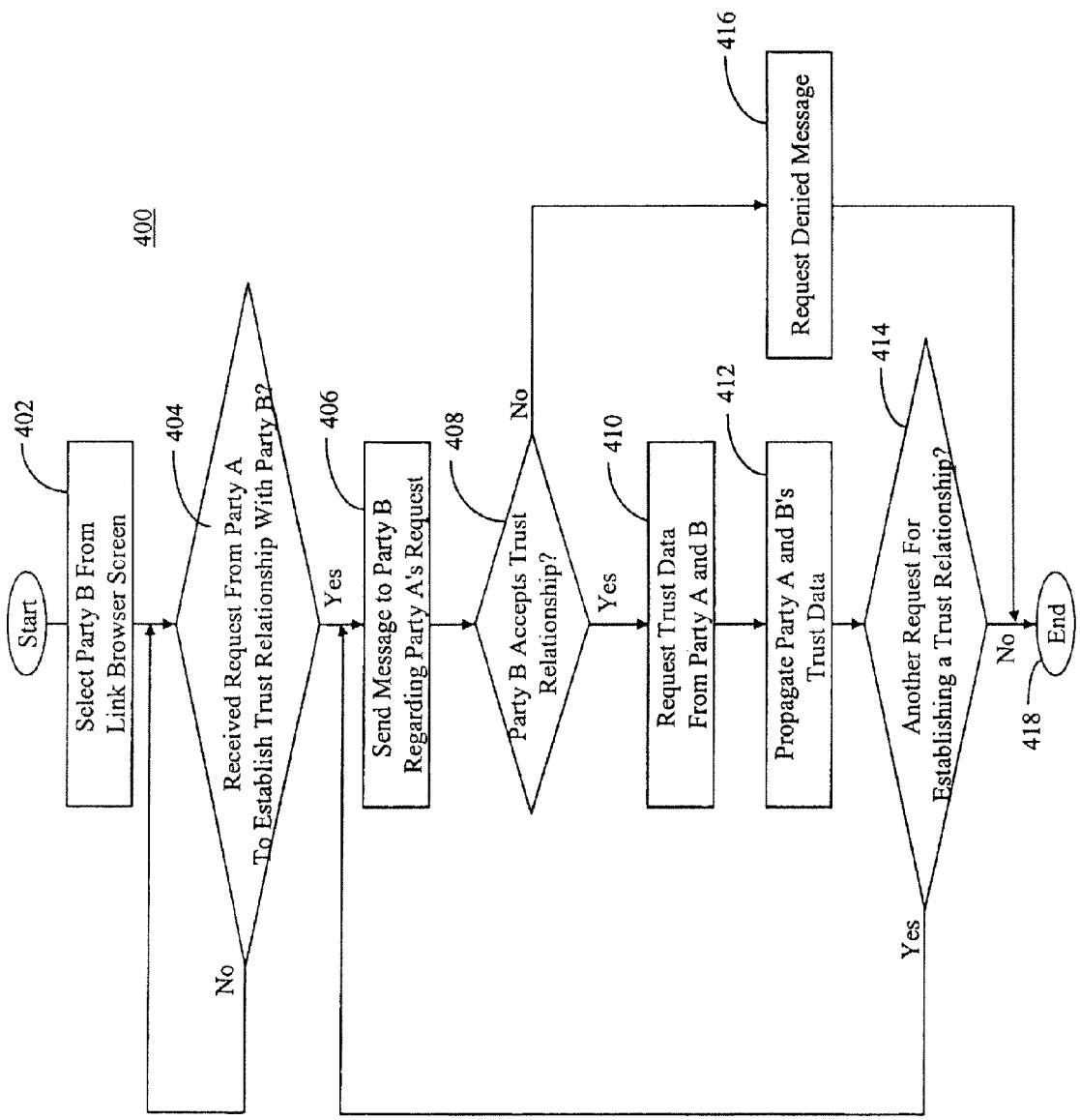
FIG. 16 shows a flowchart of an exemplary process for propagating trust.

FIG. 16 shows a flowchart 400 of an exemplary process for propagating trust data. In step 402, party A selects party B in from a link browser screen and the process goes to step 404. In step 404, the process determines whether a request is received from party A to establish a trust relationship with party B. If a request is received, the process goes to step 406; otherwise, the process return to step 404. In step 406, the process sends a message to party B indicating that party A requests to establish a trust relationship, and the process goes to step 408. In step 408, the process determines whether party B accepts the trust relationship. If party B accepts the trust relationship, the process goes to step 410; otherwise, the process goes to step 416. In step 416, the process sends a request denied message to party A and goes to step 418 and ends.

In step 410, the process requests trust data from party A and party B, and the process goes to step 412. As indicated above, the trust data may be already provided by parties A and B when requesting to establish the trust relationship and accepting the request. In step 412, the process propagates party A's trust data to party B and any other parties based on party B's control parameters for the sub-network, and propagates party B's trust data to party A and any other parties based on party A's sub-network control parameters, and the process goes to step 414. Thus, if both party A's and party B's sub-network control parameters indicate that trust data may be propagated to link level 2, for example, then each of the party's trust data may be propagated to parties that are linked to each of the other parties to a depth of link level 2. In step 414, the process determines whether another request has been received to establish a trust relationship. If another request is received, the process goes to step 406; otherwise, the process goes to step 418 and ends.

While the invention has been described in conjunction with exemplary embodiments, these embodiments should be viewed as illustrative, not limiting. Various modifications, substitutes or the like are possible within the spirit and scope of the invention.

What is claimed is:

1. A method for propagating trust data in a digital social network, the method comprising:
receiving, from a first party of the digital social network, a request to establish a trust relationship with a second party; and
responsive to receiving from the second party an acceptance of the request, propagating trust data of the first party to a third party of the digital social network based on a value of a trust propagation parameter indicative of a relationship between the second party and the third party, wherein the trust data enables secure communication between the first party and the third party.

2. The method of claim 1, further comprising:
requesting trust data from the first party and the second party if the trust data is not already available; and
modifying a trust database of the first party and a trust database of the second party.

3. The method of claim 2, further comprising:
modifying trust databases of more other parties based on the trust propagation parameters to enable secure communication between the other parties and the first party.

4. The method of claim 3, further comprising:
specifying a trust data propagation link level in the trust propagation parameters; and
modifying trust databases of only those of the other parties that relate to the first party within the link level specified in the trust propagation parameters.

5. The method of claim 2, further comprising:
retrieving the trust data from a sender selected from:
an end-user system of the first party;
an end-user system of the second party;
a database of the digital social network; and
a secured database accessible to the digital social network.

6. The method of claim 1, further comprising:
retrieving contact data from a profile of the second party; and
sending a message to the second party based on the contact data indicating that the first party requested the trust relationship.

7. The method of claim 6, the contact data indicating a preferred medium for communicating with the second party wherein the preferred medium is selected from:
email;
tangible letter;
facsimile;
communication medium within the digital social network; and
voicemail.

8. The method of claim 1, further comprising:
providing link browser data to the first party;
receiving the request from the first party via a link browser; and
propagating link data of the third party to the first party to enable the first party to view link data of the third party, wherein the propagating is based on a value of a link browsing parameter.

9. The method of claim 8, further comprising:
sending, to the first party, display data including a list of selected other parties that are linked to the third party wherein the selected other parties are determined based on a link level specified in a sub-network control parameter; and
permitting the first party to select any of the other selected parties to establish a trust relationship.

10. The method of claim 9, further comprising:
changing display data to the first party after a new trust relationship is established with an other party to include new parties that are within a link level specified by the sub-network control parameter from the other party.

11. A non-transitory computer readable medium storing processor executable program instructions that, when executed by a processor, perform a process comprising:
receiving from a first party a request to establish a trust relationship with a second party;
receiving an indication from the second party accepting the request; and
propagating trust data of the first party to a third party of a digital social network based on a value of a trust propagation parameter indicative of a relationship between the second party and the third party, wherein the trust data enables secure communication between the first party and the third party.

12. The computer readable medium of claim 11, wherein the process includes:
requesting trust data from the first party and the second party if the trust data is not already available; and
modifying a trust database of the first party and the second party.

13. The computer readable medium of claim 12, wherein the process includes:
modifying trust databases of other parties based on the trust propagation parameters to enable secure communication between the other parties and the first party.

14. The computer readable medium of claim 13, wherein the process includes:
specifying a trust data propagation link level in the trust propagation parameters; and
modifying trust databases of only those of the other parties that relate to the first party within the link level specified in the trust propagation parameters.

15. The process computer readable medium of claim 12, wherein the process includes:
retrieving the trust data from one or more of a sender selected from:
an end-user system of the first party;
an end-user system of the second party;
a database of the digital social network; and
a secured database accessible to the digital social network.

16. The computer readable medium of claim 11, wherein the process includes:
retrieving contact data from a profile of the second party; and
sending a message to the second party based on the contact data indicating that the first party requested the trust relationship, the contact data indicating possible mediums for contacting with the second party, wherein the possible mediums are selected from:
email;
written tangible letter;
facsimile;
communication medium within the digital social network; and
voicemail.

17. The computer readable medium of claim 11, wherein the process includes:
   providing link browser data to the first party;
   receiving the request from the first party via a link browser; and
   propagating link data of the third party to the first party to enable the first party to view link data of the third party, wherein the propagating is based on a value of a link browsing parameter.

18. The computer readable medium of claim 17, wherein the process includes:
   sending, to the first party, display data including a list of other selected parties that are linked to the third party wherein the selected parties are determined based on a link level specified in a sub-network control parameter; and
   permitting the first party to select any of the other selected parties to establish a trust relationship.

19. The computer readable medium of claim 18, wherein the process includes:
   changing display data to the first party after a new trust relationship is established with an other party to include new parties that are within a link level specified by the sub-network control parameter from the other party.

20. A server suitable for use in a social network comprising a plurality of parties, the server comprising:
   a controller;
   memory, accessible to the controller, storing instructions that, when executed by the controller, perform a method comprising:
   responsive to detecting consent of a second party to a request from a first party to establish a trust relationship with the second party, propagating trust data of the first party to a third party of the digital social network based on a value of a trust propagation parameter indicative of a relationship between the second party and the third party, wherein the trust data enables secure communication between the first party and the third party.

* * * * *

UNITED STATES PATENT AND TRADEMARK OFFICE
CERTIFICATE OF CORRECTION

| | | |
|---|---|---|
| PATENT NO. | : 8,234,691 B2 | Page 1 of 1 |
| APPLICATION NO. | : 12/858863 | |
| DATED | : July 31, 2012 | |
| INVENTOR(S) | : Pradeep K. Bansal et al. | |

It is certified that error appears in the above-identified patent and that said Letters Patent is hereby corrected as shown below:

Correct Claim 3 as follows:

3. The method of claim 2, further comprising:
modifying trust databases of ~~more~~ other parties based on the trust propagation parameters to enable secure communication between the other parties and the first party.

Correct Claim 15 as follows:

15. The ~~process~~ computer readable medium of claim 12, further comprising wherein the process includes: retrieving the trust data from one or more of a sender selected from:
    an end-user system of the first party;
    an end-user system of the second party;
    a database of the digital social network; and
    a secured database accessible to the digital social network.

Signed and Sealed this
Eighteenth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,234,691 B2
APPLICATION NO. : 12/858863
DATED : July 31, 2012
INVENTOR(S) : Pradeep K. Bansal et al.

It is certified that error appears in the above-identified patent and that said Letters Patent is hereby corrected as shown below:

Column 7, lines 20-23,

Correct Claim 3 as follows:

3. The method of claim 2, further comprising:
    modifying trust databases of other parties based on the trust propagation parameters to enable secure communication between the other parties and the first party.

Column 8, lines 41-49,

Correct Claim 15 as follows:

15. The computer readable medium of claim 12, further comprising wherein the process includes: retrieving the trust data from one or more of a sender selected from:
        an end-user system of the first party;
        an end-user system of the second party;
        a database of the digital social network; and
        a secured database accessible to the digital social network.

This certificate supersedes the Certificate of Correction issued September 18, 2012.

Signed and Sealed this
Ninth Day of October, 2012

David J. Kappos
*Director of the United States Patent and Trademark Office*